US012665145B2

(12) United States Patent　(10) Patent No.:　US 12,665,145 B2

Tsai　(45) Date of Patent:　Jun. 23, 2026

(54) PLASTIC BOARD AND KEYBOARD THEREOF

(71) Applicant: DARFON ELECTRONICS CORP., Taoyuan (TW)

(72) Inventor: Po-Wei Tsai, Taoyuan (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 294 days.

(21) Appl. No.: 18/657,796

(22) Filed: May 8, 2024

(65) Prior Publication Data

US 2024/0404770 A1　Dec. 5, 2024

(30) Foreign Application Priority Data

Jun. 1, 2023　(TW) ................................. 112120476

(51) Int. Cl.
*H01H 13/70*　　(2006.01)
*G06F 3/02*　　(2006.01)
*B29C 45/27*　　(2006.01)

(52) U.S. Cl.
CPC ........... *H01H 13/70* (2013.01); *G06F 3/0202* (2013.01); *B29C 45/2708* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20;
(Continued)

(56) References Cited

U.S. PATENT DOCUMENTS 4,560,845 A * 12/1985 Takamura ................ G05G 1/02
　　　　　　　　　　　　　　　　235/145 R
6,174,097 B1 * 1/2001 Daniel .................. G06F 3/0221
　　　　　　　　　　　　　　　　400/492
11,955,297 B2 * 4/2024 Horiuchi ................ H01H 13/83
　　　　　　　(Continued)

FOREIGN PATENT DOCUMENTS

CN　　　105761990 A　　7/2016
TW　　　201735081 A　　10/2017
　　　　　　(Continued)

*Primary Examiner* — Ahmed M Saeed
(74) *Attorney, Agent, or Firm* — Winston Hsu

(57) ABSTRACT

A plastic board suitable for a keyboard having first and second keyswitch sets includes first and second board portions and transverse dividing slots. The first and second board portions have first and second mounting areas respectively corresponding to the first and second keyswitch sets. First dividing slots of the first board portion extend sequentially along a periphery of at least one first mounting area to separate first and second board regions. Second dividing slots of the second board portion extend sequentially along a periphery of at least one second mounting area to separate third and fourth board regions. The transverse dividing slots are formed separately between the first and second board portions to separate the first and third board regions and separate the second and fourth board regions. The first, second, third, and fourth board regions have a feeding point, respectively, to be formed by an injection molding process.

5 Claims, 5 Drawing Sheets

(58) Field of Classification Search
CPC ..... H01H 13/88; G06F 1/1669; G06F 1/1616; B29C 45/2708
See application file for complete search history.

(56) References Cited

U.S. PATENT DOCUMENTS

| 2010/0225020 | A1* | 9/2010 | Tracy | B29C 45/0025 |
| | | | | 264/161 |
| 2013/0049995 | A1* | 2/2013 | Wu | H01H 13/83 |
| | | | | 341/22 |
| 2021/0157045 | A1* | 5/2021 | Chen | H01H 13/14 |
| 2022/0035416 | A1* | 2/2022 | Pan | H01H 13/023 |

FOREIGN PATENT DOCUMENTS

| TW | I611448 | B | 1/2018 |
| TW | M580213 | U | 7/2019 |

* cited by examiner

PLASTIC BOARD AND KEYBOARD THEREOF

BACKGROUND OF THE INVENTION

1. Field of the Invention

The present invention relates to a plastic board and a keyboard thereof, and more specifically, to a plastic board utilizing dividing slots to separate different board regions formed respectively by an injection molding process and a keyboard thereof.

2. Description of the Prior Art

A keyboard, which is the most common input device, can be found in variety of electronic apparatuses for users to input characters, symbols, numerals and so on. Furthermore, consumer electronic products and industrial machine tools are all equipped with a keyboard for performing input operations.

With the development of technology, consumers expect electronic products to be lightweight and portable, hence keyboard designs have also evolved toward being thinner and lighter. A lightweight keyboard design is mostly achieved by reducing a thickness/weight of each keyboard component. Among these keyboard components, a bottom board is often larger in size and made of metal. Therefore, the prior art usually adopts a design in which the bottom board is made of plastic material and formed by an injection molding process to replace a metal board. However, since the bottom board made of plastic material has a large area, it may result in partial structural deformation (e.g., wave-like deformation) of the bottom board when the whole bottom board is formed by the injection molding process, thereby affecting the manufacturing quality and structural forming precision of the bottom board.

SUMMARY OF THE INVENTION

The present invention provides a plastic board suitable for a keyboard having at least one first keyswitch set and at least one second keyswitch set. The at least one first keyswitch set includes a plurality of first keyswitches arranged along a transverse direction. The at least one second keyswitch set includes a plurality of second keyswitches arranged along the transverse direction. The at least one first keyswitch set and the at least one second keyswitch set are disposed on the plastic board. The plastic board includes a first board portion, a second board portion, and a plurality of transverse dividing slots. The first board portion has a plurality of first mounting areas corresponding to the plurality of first keyswitches. A plurality of first dividing slots extends sequentially along a periphery of at least one first mounting area within a first middle section of the first board portion to separate a first board region and a second board region on the first board portion. The second board portion has a plurality of second mounting areas corresponding to the plurality of second keyswitches. A plurality of second dividing slots extends sequentially along a periphery of at least one second mounting area within a second middle section of the second board portion to separate a third board region and a fourth board region on the second board portion. The plurality of transverse dividing slots is formed separately between the first board portion and the second board portion to separate the first board region and the third board region and separate the second board region and the fourth board region. The first board region, the second board region, the third board region, and the fourth board region have at least one feeding point, respectively, to be formed by an injection molding process.

The present invention further provides a keyboard including at least one first keyswitch set, at least one second keyswitch set, and a plastic board. The at least one first keyswitch set includes a plurality of first keyswitches arranged along a transverse direction. The at least one second keyswitch set includes a plurality of second keyswitches arranged along the transverse direction. The plastic board is connected to the at least one first keyswitch set and the at least one second keyswitch set. The plastic board includes a first board portion, a second board portion, and a plurality of transverse dividing slots. The first board portion has a plurality of first mounting areas corresponding to the plurality of first keyswitches. A plurality of first dividing slots extends sequentially along a periphery of at least one first mounting area within a first middle section of the first board portion to separate a first board region and a second board region on the first board portion. The second board portion has a plurality of second mounting areas corresponding to the plurality of second keyswitches. A plurality of second dividing slots extends sequentially along a periphery of at least one second mounting area within a second middle section of the second board portion to separate a third board region and a fourth board region on the second board portion. The plurality of transverse dividing slots is formed separately between the first board portion and the second board portion to separate the first board region and the third board region and separate the second board region and the fourth board region. The first board region, the second board region, the third board region, and the fourth board region have at least one feeding point, respectively, to be formed by an injection molding process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
FIG. 1 is a diagram of a keyboard according to an embodiment of the present invention.

The present invention will now be described more specifically with reference to the following embodiments. The advantages and spirit of the invention can be further understood in view of the detailed descriptions and the accompanying drawings. The present invention can be implemented or applied to other different embodiments. Certain aspects of the present invention are not limited by the particular details of the examples illustrated herein. Without departing from the spirit and scope of the invention, the present invention will have other modifications and changes. It should be understood that the appended drawings are not necessarily drawn to scale and the configuration of each component (e.g., the number, forming positions, and sizes of dividing slots) in the drawings is merely illustrative, not presenting an actual condition of the embodiments.

Please refer to FIG. 1, which is a diagram of a keyboard 10 according to an embodiment of the present invention. The keyswitch 10 could be preferably a keyboard apparatus applied to a personal computer, but not limited thereto, meaning that the keyboard 10 could be also applied to a portable electronic device having a foldable mechanism composed of an upper cover and a lower casing (e.g., a notebook or a keyboard device). As shown in FIG. 1, the keyboard 10 includes at least one first keyswitch set 12 (three sets shown in FIG. 1, but the number of keyswitch sets and the keyswitch configuration of the first keyswitch set 12 are not limited to FIG. 1), at least one second keyswitch set 14 (three sets shown in FIG. 1, but the number of keyswitch sets and the keyswitch configuration of the second keyswitch set 14 are not limited to FIG. 1), and a plastic board 16. The first keyswitch set 12 and the second keyswitch set 14 have a plurality of first keyswitches 18 and a plurality of second keyswitches 20, respectively. The plurality of first keyswitches 18 and the plurality of second keyswitches 20 are arranged along a transverse direction T as shown in FIG. 1 for a user to press, thereby executing a desired input function.

Figure 2:
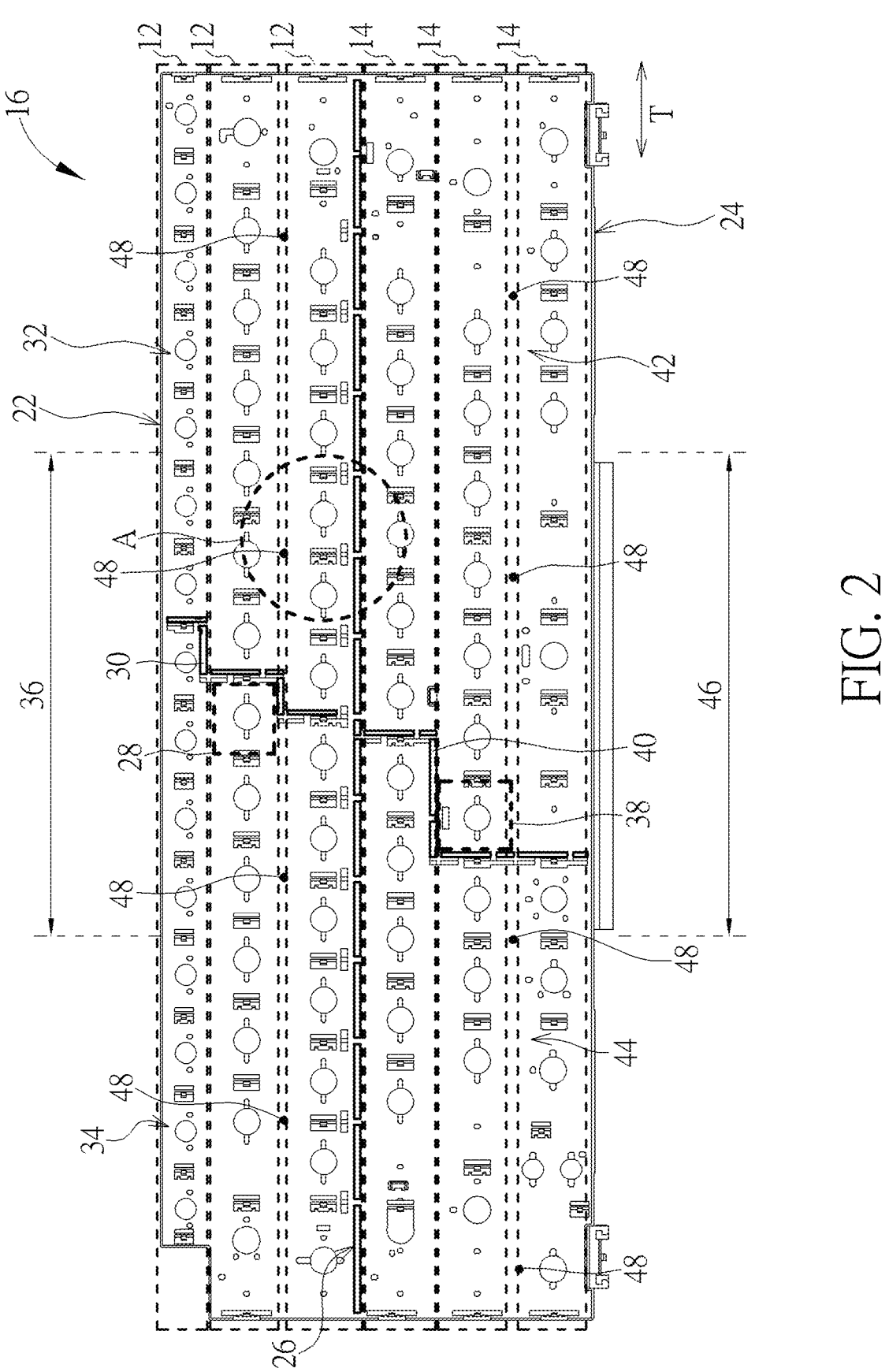
FIG. 2 is a bottom view of a plastic board in FIG. 1.
Figure 3:
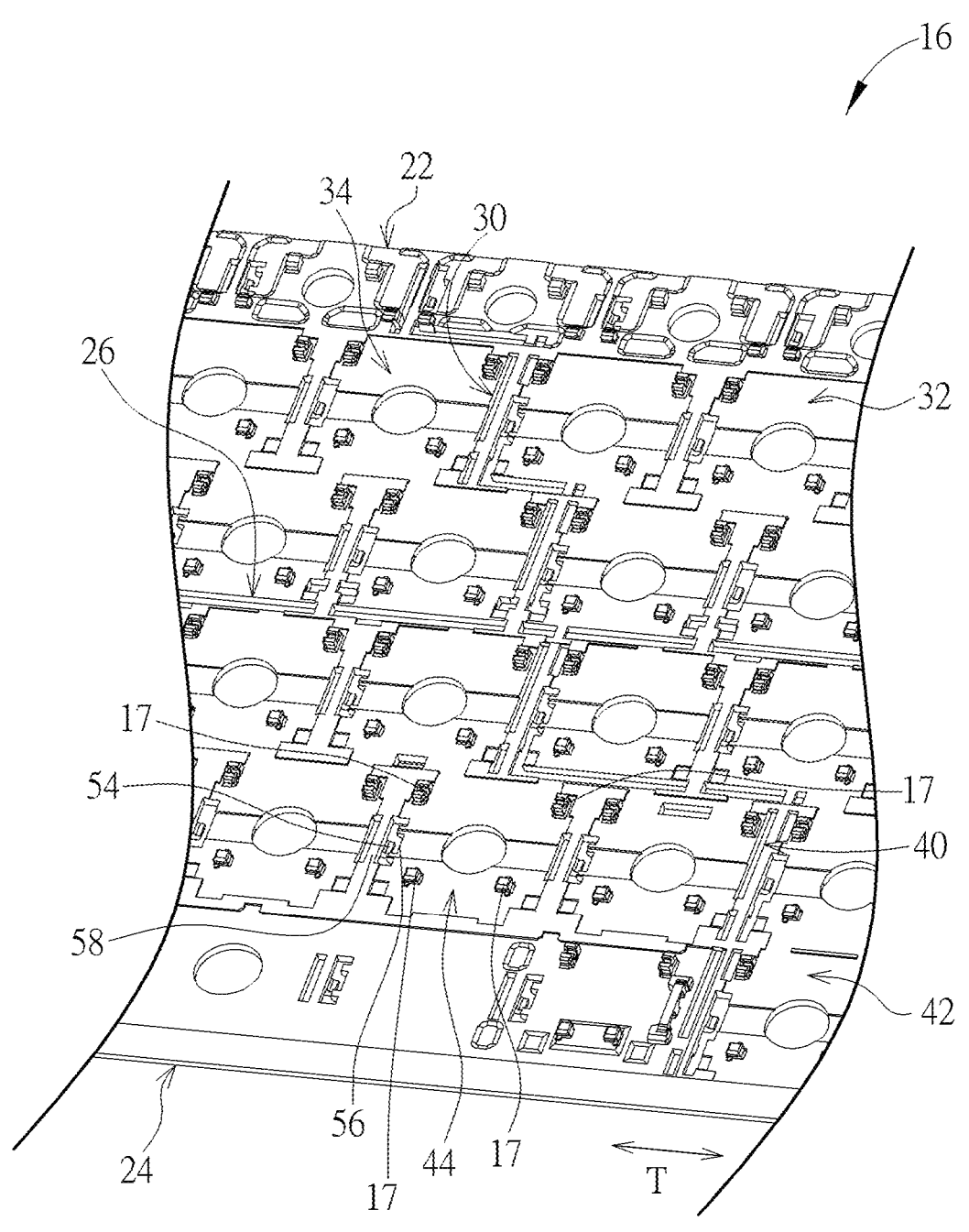
FIG. 3 is a partial diagram of the plastic board in FIG. 2 from another viewing angle.

More detailed description for the structural design of the plastic board 16 is provided as follows. Please refer to FIGS. 1, 2, and 3. FIG. 2 is a bottom view of the plastic board 16 in FIG. 1. FIG. 3 is a partial diagram of the plastic board 16 in FIG. 2 from another viewing angle. For clearly showing arrangement of the first keyswitch sets 12 and the second keyswitch sets 14 on the plastic board 16, three first keyswitch sets 12 and three second keyswitch sets 14 are simply represented by dashed rectangular frames in FIG. 2. As shown in FIGS. 1, 2, and 3, the plastic board 16 is connected to the first keyswitch set 12 and the second keyswitch set 14 to support the plurality of first keyswitches 18 and the plurality of second keyswitches 20 to move upward and downward. To be more specific, the plastic board 16 has at least one connecting structure 17 (four shown in FIG. 3, but not limited thereto) formed integrally corresponding to each first keyswitch 18 and each second keyswitch 20. The connecting structure 17 is movably connected to the first keyswitch 18 and the second keyswitch 20 (the related description for the movable connection design of the connecting structure 17 is commonly seen in the prior art and omitted herein), to make the first keyswitch 18 and the second keyswitch 20 movable upward and downward relative to the plastic board 16 for a user to perform input operations. The plastic board 16 includes a first board portion 22, a second board portion 24, and a plurality of transverse dividing slots 26. The first board portion 22 has a plurality of first mounting areas 28 (briefly represented by only one dashed square frame within a first middle section 36 of the first board portion 22 in FIG. 2) corresponding to the plurality of first keyswitches 18. A plurality of first dividing slots 30 (shown as thick black narrow slots in FIG. 2) is formed on the first board portion 22. The plurality of first dividing slots 30 extends sequentially along a periphery of at least one first mounting area 18 within the first middle section 36 of the first board portion 22 (preferably arranged in a stepped pattern as shown in FIG. 2 to define a dividing boundary, but not limited thereto), so as to separate a first board region 32 and a second board region 34 on the first board portion 22. The second board portion 24 has a plurality of second mounting areas 38 (briefly represented by only one dashed square frame within a second middle section 46 of the second board portion 24 in FIG. 2)

corresponding to the plurality of second keyswitches 18. A plurality of second dividing slots 40 (shown as thick black narrow slots in FIG. 2) is formed on the second board portion 24. The plurality of second dividing slots 40 extends sequentially along a periphery of at least one second mounting area 20 within the second middle section 46 of the second board portion 24 (preferably arranged in a stepped pattern as shown in FIG. 2 to define a dividing boundary, but not limited thereto), so as to separate a third board region 42 and a fourth board region 44 on the second board portion 24. The plurality of transverse dividing slots 26 (shown as thick black transverse slots in FIG. 2) are formed separately along the transverse direction T between the first board portion 22 and the second board portion 24, to separate the first board region 32 from the third board region 42 and separate the second board region 34 from the fourth board region 44 on the plastic board 16. Each of the first board region 32, the second board region 34, the third board region 42, and the fourth board region 44 respectively has at least one feeding point 48 (two formed in each board region as shown in FIG. 2, but not limited thereto).

Via the dividing design in which the dividing slots (i.e. the transverse slots 26, the first dividing slots 30, and the second dividing slots 40) are utilized to divide the plastic board 16 into the first board region 32, the second board region 34, the third board region 42, and the fourth board region 44, and the sectional molding design in which each of these board regions is formed by an injection molding process via the corresponding feeding point 48, the plastic board 16 provided by the present invention can be sectionally molded instead of adopting the prior art design in which the whole bottom board is formed by the injection molding process. In such a manner, the present invention can efficiently solve the prior art problem that the large molding area of the whole bottom board leads to partial structural deformation (e.g., wave-like deformation), so as to greatly enhancing the manufacturing quality and structural forming precision of the plastic board.

Figure 4:
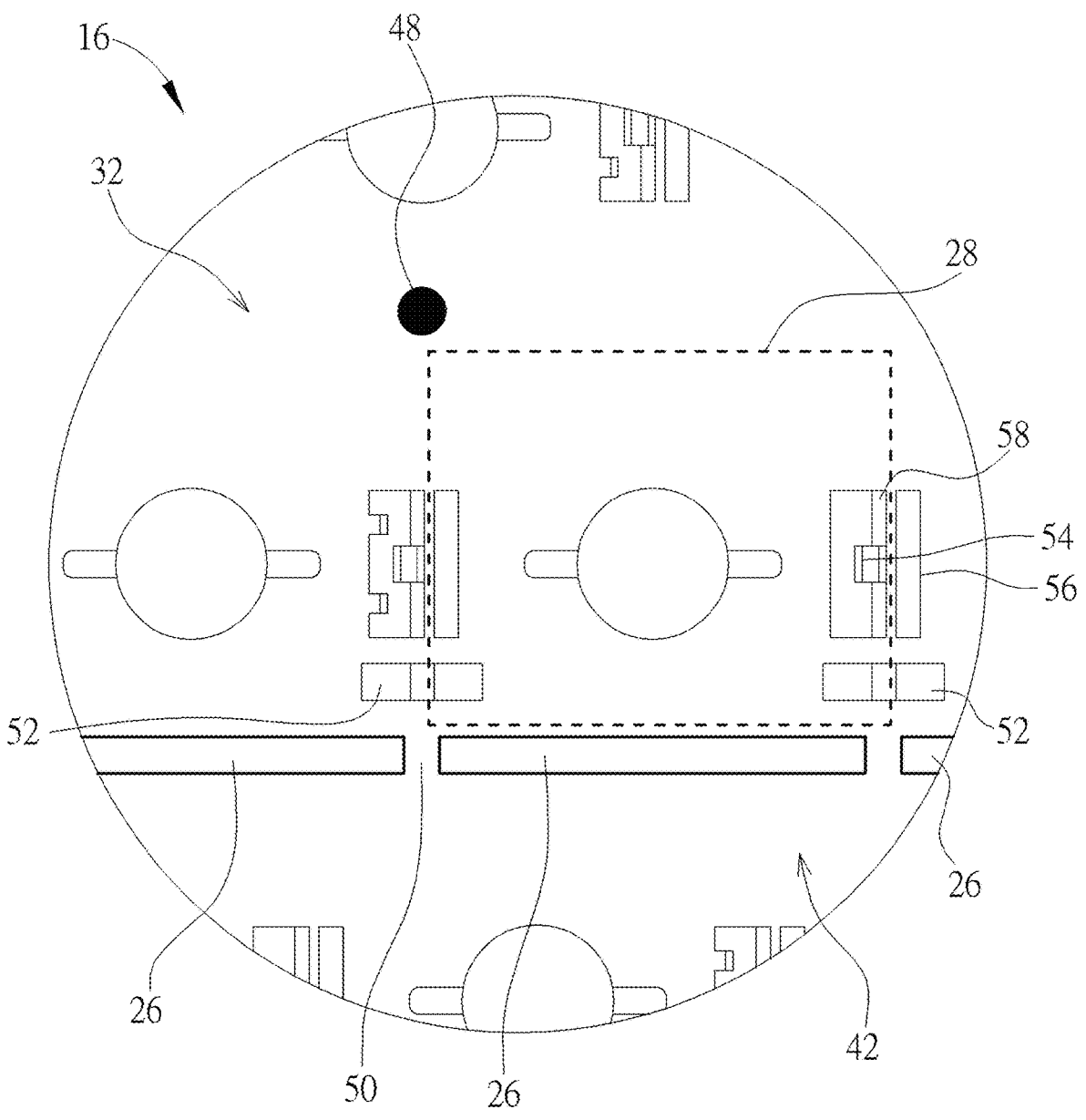
FIG. 4 is an enlarged diagram of an area A in FIG. 2.

It should be mentioned that the present invention could further adopt a stop slot design. For example, please refer to FIGS. 2 and 4. FIG. 4 is an enlarged diagram of an area A in FIG. 2. As shown in FIGS. 2 and 4, a stop slot 52 could be formed at a position within the first board region 32 corresponding to a bridge section 50 of two adjacent transverse dividing slots 26 (but not limited thereto, meaning that the stop slot 52 could also be formed at a position within the third board region 42 corresponding to the bridge section 50). In this way, during the injection molding process of the first board region 32 and the third board region 42 via the feeding points 48, the stop slot 52 can act like a wave breaker for avoiding stress concentration and deformation at the bridge section 50 in the first board region 32 and the third board region 42, so as to enhance the manufacturing quality and structural forming precision of the plastic baseboard 16. To be noted, the aforesaid stop slot design could be selectively applied to the second board region 34, the third board region 42, and the fourth board region 44 of the plastic baseboard 16. The related description for the derived embodiments (e.g., an embodiment in which at least one of the first board region 32 and the second board region 34 forms a stop slot at a position corresponding to the bridge section of any two adjacent first dividing slots 26) could be reasoned by analogy according to the aforesaid embodiment and omitted herein.

Figure 5:
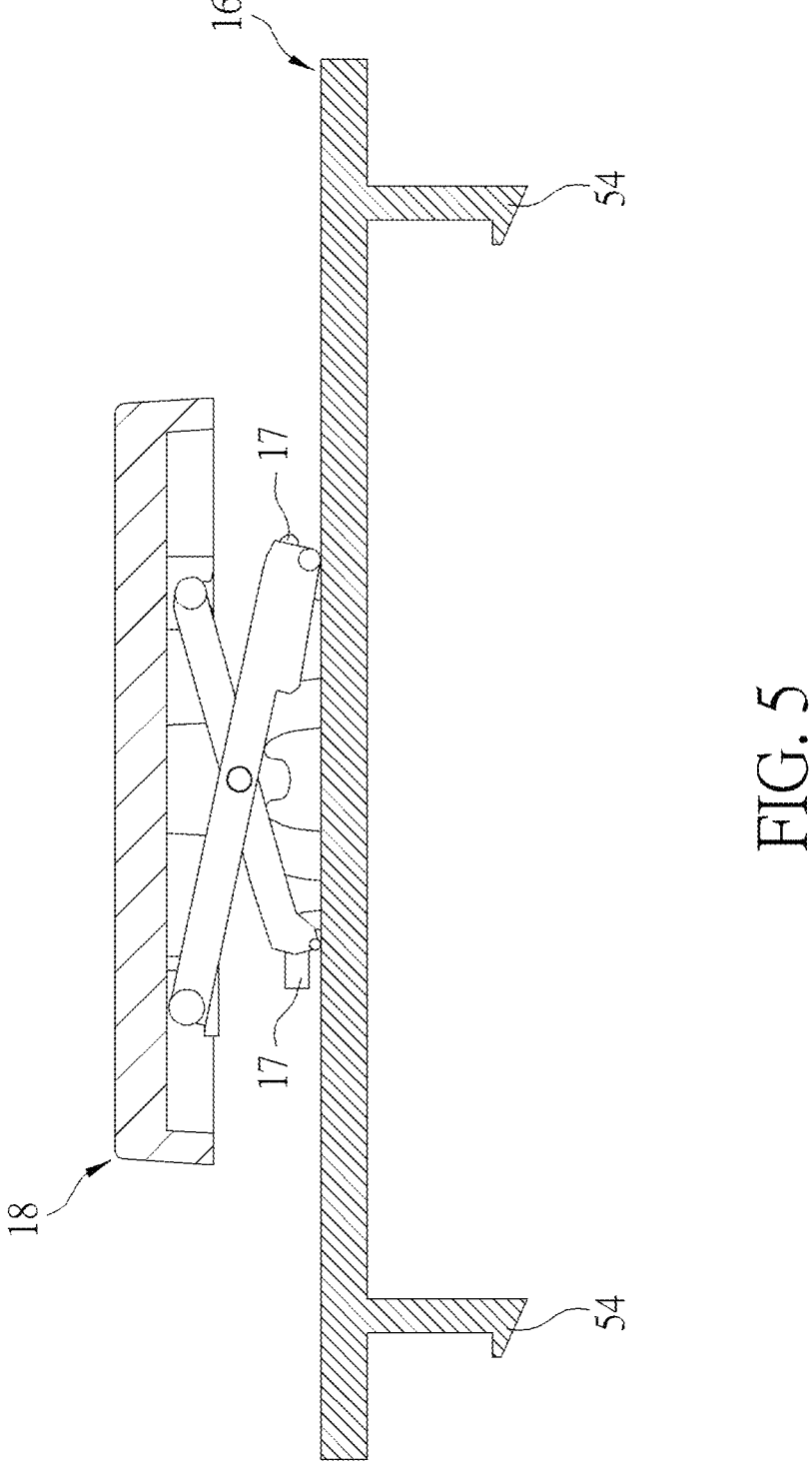
FIG. 5 is a cross-sectional diagram of the plastic board in FIG. 3 connected to the first keyswitch.

Furthermore, for enhancing the assembly and disassembly convenience of the plastic board 16, the present invention could further adopt a hook arm design. For example, please refer to FIGS. 2, 3, 4, and 5. FIG. 5 is a cross-sectional diagram of the plastic board 16 in FIG. 3 connected to the first keyswitch 18 (the related description for connection of the plastic board 16 and the second keyswitch 20 could be reasoned by analogy and omitted herein). For clearly show- ing the structural relationship between the first mounting area 28 and a hook arm 54, the first mounting area 28 is represented by a dashed square frame in FIG. 4, and the forming position and size of the hook arm 54 on the plastic board 16 are for illustrative purposes only and not limited to FIG. 5. In addition, the aforesaid hook arm design could also be applied to the second mounting area 38, and the related description could be reasoned by analogy according to FIG. 4. As shown in FIGS. 2, 3, 4, and 5, the hook arm 54 could be integrally formed at a position on the plastic board 16 corresponding to the first mounting area 28 and extend downward to be engaged with a holding board (e.g., being engaged with a hole structure on the holding board (not shown in the figures)) of a computer device (e.g., a note- book). As for the related description for the holding board design of the computer device and the engaging design of the hook arm and the hole structure, it is commonly seen in the prior art and omitted herein. In such a manner, the keyboard 10 can be detachably mounted on the aforemen- tioned computer device. To be more specific, in practical applications, the plastic board 16 could have a hole 56 corresponding to the hook arm 54, and a rib 58 could be suspended in the hole 56 and connected to the hook arm 54. Via this design, the present invention can increase elasticity of the hook arm 54, so as to make it easier and more time-efficient for a user to complete the engaging operation of the hook arm 54, thereby further enhancing the assembly and disassembly convenience of the plastic board 16.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard comprising:
at least one first keyswitch set comprising a plurality of first keyswitches arranged along a transverse direction;
at least one second keyswitch set comprising a plurality of second keyswitches arranged along the transverse direction; and a plastic board connected to the at least one first keyswitch set and the at least one second keyswitch set, the plastic board comprising:
a first board portion having a plurality of first mounting areas corresponding to the plurality of first key- switches, a plurality of first dividing slots extending sequentially along a periphery of at least one first mounting area within a first middle section of the first board portion to separate a first board region and a second board region on the first board portion;
a second board portion having a plurality of second mounting areas corresponding to the plurality of second keyswitches, a plurality of second dividing slots extending sequentially along a periphery of at least one second mounting area within a second middle section of the second board portion to sepa- rate a third board region and a fourth board region on the second board portion; and
a plurality of transverse dividing slots formed sepa- rately between the first board portion and the second board portion to separate the first board region and the third board region and separate the second board region and the fourth board region;
wherein the first board region, the second board region, the third board region, and the fourth board region have at least one feeding point, respectively, to be formed by an injection molding process.

2. The keyboard of claim 1, wherein at least one of the first board region and the third board region forms a stop slot at a position corresponding to a bridge section of any two adjacent transverse dividing slots.

3. The keyboard of claim 1, wherein at least one of the first board region and the second board region forms a stop slot at a position corresponding to a bridge section of any two adjacent first dividing slots.

4. The keyboard of claim 1, wherein a plurality of hook arms is integrally formed at a position on the plastic board corresponding to the plurality of first mounting areas and extends downward to be engaged with a holding board of a computer device, to make the keyboard detachably mounted on the computer device.

5. The keyboard of claim 4, wherein the plastic board has a hole corresponding to the hook arm, and a rib is suspended in the hole and connected to the hook arm.

* * * * *